United States Patent
Nagakura et al.

(10) Patent No.: US 9,352,655 B2
(45) Date of Patent: May 31, 2016

(54) BRAKE DEVICE FOR VEHICLE AND CONTROL METHOD THEREOF

(71) Applicant: Bosch Corporation, Tokyo (JP)

(72) Inventors: Yasutaka Nagakura, Kanagawa (JP); Motomu Hakiai, Kanagawa (JP)

(73) Assignee: Bosch Corporation, Tokyo (JP)

(*) Notice: Subject to any disclaimer, the term of this patent is extended or adjusted under 35 U.S.C. 154(b) by 0 days.

(21) Appl. No.: 14/375,477

(22) PCT Filed: Jan. 29, 2013

(86) PCT No.: PCT/JP2013/051868
§ 371 (c)(1),
(2) Date: Sep. 12, 2014

(87) PCT Pub. No.: WO2013/115166
PCT Pub. Date: Aug. 8, 2013

(65) Prior Publication Data
US 2015/0048670 A1    Feb. 19, 2015

(30) Foreign Application Priority Data
Jan. 30, 2012 (JP) .................... 2012-016725

(51) Int. Cl.
*B60L 7/18* (2006.01)
*B60T 8/48* (2006.01)
*B60T 1/10* (2006.01)
*B60T 13/58* (2006.01)
(Continued)

(52) U.S. Cl.
CPC ... *B60L 7/18* (2013.01); *B60T 1/10* (2013.01); *B60T 8/4872* (2013.01); *B60T 13/585* (2013.01); *B60T 13/686* (2013.01); *B60T 15/028* (2013.01); *B60T 2270/604* (2013.01)

(58) Field of Classification Search
CPC ............... B60L 7/26; B60L 7/20; B60L 7/18; B60T 8/4872; B60T 2270/604; B60T 1/10; B60T 13/585; B60T 13/686; B60T 15/028
USPC ............................... 303/3, 10, 11, 152, 166.1
See application file for complete search history.

(56) References Cited

U.S. PATENT DOCUMENTS

| | | | |
|---|---|---|---|
| 2007/0013230 A1 | 1/2007 | Yang | |
| 2008/0228367 A1 | 9/2008 | Aoki et al. | |
| 2010/0036577 A1* | 2/2010 | Kodama | B60L 7/26 303/152 |

(Continued)

FOREIGN PATENT DOCUMENTS

| | | |
|---|---|---|
| JP | 2007500104 | 1/2007 |
| JP | 2009202678 | 9/2009 |

(Continued)

OTHER PUBLICATIONS

International Search Report for Application No. PCT/JP2013/051868 dated May 7, 2013 (English Translation, 2 pages).

*Primary Examiner* — Melanie Torres Williams
(74) *Attorney, Agent, or Firm* — Michael Best & Friedrich LLP

(57) ABSTRACT

A brake device for a vehicle, that includes at least a first hydraulic brake and a second hydraulic brake which produce hydraulic brake forces, and a regenerative brake which produces a regenerative brake force, and that performs a distribution of the hydraulic brake force and the regenerative brake force with respect to a driver request brake force.

19 Claims, 4 Drawing Sheets

(51) Int. Cl.
   *B60T 13/68* (2006.01)
   *B60T 15/02* (2006.01)

(56) References Cited

U.S. PATENT DOCUMENTS

| | | | |
|---|---|---|---|
| 2010/0187901 A1* | 7/2010 | Sonoda | B60L 7/10 303/11 |
| 2013/0002008 A1* | 1/2013 | Matsuoka | B60T 7/042 303/3 |
| 2014/0167495 A1* | 6/2014 | Murayama | B60T 8/4081 303/116.1 |

FOREIGN PATENT DOCUMENTS

| | | |
|---|---|---|
| WO | 2012032897 | 3/2012 |
| WO | 2012086290 | 6/2012 |

* cited by examiner (A)

(B)

(C)

BRAKE DEVICE FOR VEHICLE AND CONTROL METHOD THEREOF

BACKGROUND OF THE INVENTION

The present invention relates to a brake device for a vehicle and a control method thereof, and particularly to a brake device which includes a hydraulic brake and a regenerative brake for producing a regenerative brake force, and which can distribute a braking force between a hydraulic brake force and the regenerative brake force, and a control method thereof.

As a brake device for a vehicle of the related art, a brake device for a vehicle, which includes both a hydraulic brake for producing a hydraulic brake force using a hydraulic pressure being produced according to a brake operation of a driver, and a regenerative brake for producing a regenerative brake force, and which performs a regenerative cooperation by distributing a braking force between the hydraulic brake force and the regenerative brake force, is known.

An object of the regenerative brake being used for such a brake device for a vehicle is to convert kinetic energy of a vehicle wheel at the time of braking into electrical energy and to effectively use the energy, but a maximum regenerative brake force which can be regenerated by the regenerative brake is limited by a vehicle speed at the time of the vehicle braking, a charging state of a battery or the like. For this reason, it is preferable that a ratio between the braking force produced by the hydraulic brake and the braking force produced by the regenerative brake be changed according to the maximum regenerative brake force, and a proportion of the regenerative brake be increased, from a viewpoint of effective use of energy, even while the hydraulic brake is performed.

For this reason, various methods have been proposed to perform the regenerative cooperation, but in a case where the ratio of the regenerative brake with respect to the braking force is changed, the driver feels discomfort in brake feel. For this reason, as a means of obtaining comfortable brake feel, when the braking is performed by the regenerative brake, brake fluid escapes into a low pressure accumulator via a pressure decreasing valve, and when the hydraulic pressure is increased, the brake fluid is pumped out of the accumulator by a motor pump unit which is electrically controlled (for example, refer to JP-T-2007-500104).

SUMMARY OF INVENTION

In the above-described brake device for a vehicle, it is intended that when the regenerative brake is used, the pressure decreasing valve is opened, and the brake fluid escapes into the low pressure accumulator, thereby realizing comfortable brake feel. However, when the pressure decreasing valve is opened, pressure of a few bars is applied to the vehicle wheels by a reaction of an accumulator. For this reason, even in a case where the braking force can be covered by only the regenerative brake force, there is a case where it is not possible to sufficiently use the regenerative brake force.

In addition, in the above-described brake device for a vehicle, which allows the brake fluid supplied to brake calipers to escape into the low pressure accumulator via the pressure decreasing valve, the pressure decreasing valve can be fully opened only or fully closed only, and exhaust amount adjustment is performed by repeating opening and closing. At this time, pulsation is produced in the brake fluid, and particularly when a hydraulic difference in the brake fluid is increased at the front and the rear of the pressure decreasing valve, there is concern that noise may be produced by water hammer or the like.

Taking the above-described related art into consideration, an object of the present invention is that a regenerative brake force be sufficiently used by suppressing an influence of a reaction of an accumulator when a pressure decreasing valve is opened.

In addition, another object of the present invention is that the problems of the above-described related art be solved, and noise not be produced when a pressure of brake fluid supplied to brake calipers is decreased.

According to the invention, there is provided a brake device for a vehicle, that includes at least a first hydraulic brake and a second hydraulic brake which produce hydraulic brake forces, and a regenerative brake which produces a regenerative brake force, and that performs a distribution of the hydraulic brake force and the regenerative brake force with respect to a driver request brake force, including:

a first pressure increasing valve which can increase a pressure of brake fluid supplied to the first hydraulic brake; a first pressure decreasing valve which can decrease the pressure of the brake fluid supplied to the first hydraulic brake; a second pressure increasing valve which can increase a pressure of brake fluid supplied to the second hydraulic brake; and a second pressure decreasing valve which can decrease the pressure of the brake fluid supplied to the second hydraulic brake, wherein the first pressure decreasing valve and the second pressure decreasing valve communicate with an accumulator, and wherein while the driver request brake force is covered by only the regenerative brake force, the first pressure increasing valve and the first pressure decreasing valve are opened, and the second pressure increasing valve and the second pressure decreasing valve are closed.

According to this configuration, while a driver request brake force is covered by only the regenerative brake force, the first pressure increasing valve and the first pressure decreasing valve are opened, and the second pressure increasing valve and the second pressure decreasing valve are closed. That is, while the driver request brake force is covered by only the regenerative brake force, it is possible to allow the brake fluid to escape into the accumulator by opening both the pressure decreasing valve and the pressure increasing valve with regard to the first hydraulic brake, and on the other hand, it is possible that the reaction of the accumulator is not applied to vehicle wheels by closing both the pressure decreasing valve and the pressure increasing valve with regard to the second hydraulic brake. Thus, it is possible to secure comfortable brake feel, to suppress an influence of the reaction of the accumulator, and to sufficiently use the regenerative brake force.

According to the invention, in the brake device for a vehicle, the first hydraulic brake is a rear wheel hydraulic brake, and the second hydraulic brake is a front wheel hydraulic brake.

According to this configuration, the first hydraulic brake is a rear wheel hydraulic brake, and the second hydraulic brake is a front wheel hydraulic brake. That is, while the driver request brake force is covered by only the regenerative brake force, it is possible to allow the brake fluid to escape into the accumulator by opening both the pressure decreasing valve and the pressure increasing valve with regard to the rear wheel hydraulic brake, and on the other hand, it is possible that the reaction of the accumulator is not applied to the front wheels by closing both the pressure decreasing valve and the pressure increasing valve with regard to the front wheel hydraulic brake. Thus, it is possible to secure the comfortable brake feel, to suppress the influence of the reaction of the accumulator, and to sufficiently use the regenerative brake force. In addition, since the front wheel side brake force predominates in the braking force, it is possible to remarkably reduce dragging of the brake caused by the reaction of the accumulator, and to sufficiently use the regenerative brake force, by having such that the reaction of the accumulator is not applied particularly to the front wheels.

According to the invention, in the brake device for a vehicle, the brake device further includes multiple brake lines, and the first hydraulic brake and the second hydraulic brake are provided in one brake line.

According to this configuration, the first hydraulic brake and the second hydraulic brake are provided in one brake line. For this reason, it is possible to decrease an amount of brake fluid escaping into the accumulator, compared to a case where each of the first hydraulic brake and the second hydraulic brake are provided in different brake lines. As a result, it is possible to reduce rotational frequency of the pump motor, and to decrease noise and vibration when the pump motor operates.

According to the invention, in the brake device for a vehicle, the first pressure increasing valve is provided between the first hydraulic brake and the second hydraulic brake, and is an adjustment valve which can continually adjust an amount of the brake fluid flowing from the second hydraulic brake side to the first hydraulic brake side, and in a case where a hydraulic brake force of the second hydraulic brake is decreased, an opening degree of the adjustment valve is continually increased and the first pressure decreasing valve is opened.

In this case, the first hydraulic brake may not produce the braking force, if the hydraulic brake force of the second hydraulic brake is reduced. The first pressure decreasing valve is a solenoid valve which can be intermittently opened and closed, and may maintain an opened state, if the hydraulic brake force of the second hydraulic brake is reduced. The second pressure decreasing valve may maintain a closed state if the regenerative brake force increases.

According to the invention, there is provided a control method of a brake device for a vehicle, that includes at least a first hydraulic brake and a second hydraulic brake which produce hydraulic brake forces, and a regenerative brake which produces a regenerative brake force, and that performs a distribution of the hydraulic brake force and the regenerative brake force with respect to a driver request brake force. The brake device for a vehicle includes a first pressure increasing valve which can increase a pressure of brake fluid supplied to the first hydraulic brake, a first pressure decreasing valve which can decrease the pressure of the brake fluid supplied to the first hydraulic brake, a second pressure increasing valve which can increase a pressure of brake fluid supplied to the second hydraulic brake, and a second pressure decreasing valve which can decrease the pressure of the brake fluid supplied to the second hydraulic brake, wherein the first pressure decreasing valve and the second pressure decreasing valve communicate with an accumulator. The control method, in a case where the driver request brake force is covered by only the regenerative brake force, includes a step of opening the first pressure decreasing valve, a step of opening the first pressure increasing valve, a step of closing the second pressure decreasing valve, and a step of closing the second pressure increasing valve.

According to the invention, in the control method of the brake device for a vehicle, the first hydraulic brake is a rear wheel hydraulic brake, and the second hydraulic brake is a front wheel hydraulic brake.

According to the invention, in the control method of the brake device for a vehicle, the brake device for a vehicle further includes multiple brake lines, and the first hydraulic brake and the second hydraulic brake are provided in one brake line.

According to the invention, in the control method of the brake device for a vehicle, the first pressure increasing valve is provided between the first hydraulic brake and the second hydraulic brake, and is an adjustment valve which can continually adjust an amount of the brake fluid flowing from the second hydraulic brake side to the first hydraulic brake side. The control method, in a case where a hydraulic brake force of the second hydraulic brake is decreased, further includes a step of continually increasing an opening degree of the adjustment valve, and a step of opening the first pressure decreasing valve.

In this case, the first hydraulic brake may not produce the braking force, if the hydraulic brake force of the second hydraulic brake is reduced. The first pressure decreasing valve is a solenoid valve which can be intermittently opened and closed, and may maintain the opened state, if the hydraulic brake force of the second hydraulic brake is reduced. The second pressure decreasing valve may maintain the closed state if the regenerative brake force increases.

According to the present invention, in a case where a braking force is covered by only a regenerative brake force, it is possible to suppress an influence of a reaction of an accumulator when a pressure decreasing valve is opened, and to secure comfortable brake feel and sufficiently use the regenerative brake force.

In addition, in the present invention, it is possible that noise is not produced, when a pressure of brake fluid supplied to brake calipers is decreased.

DETAILED DESCRIPTION

Hereinafter, a preferable embodiment according to the present invention will be described with reference to the drawings.

Figure 1:
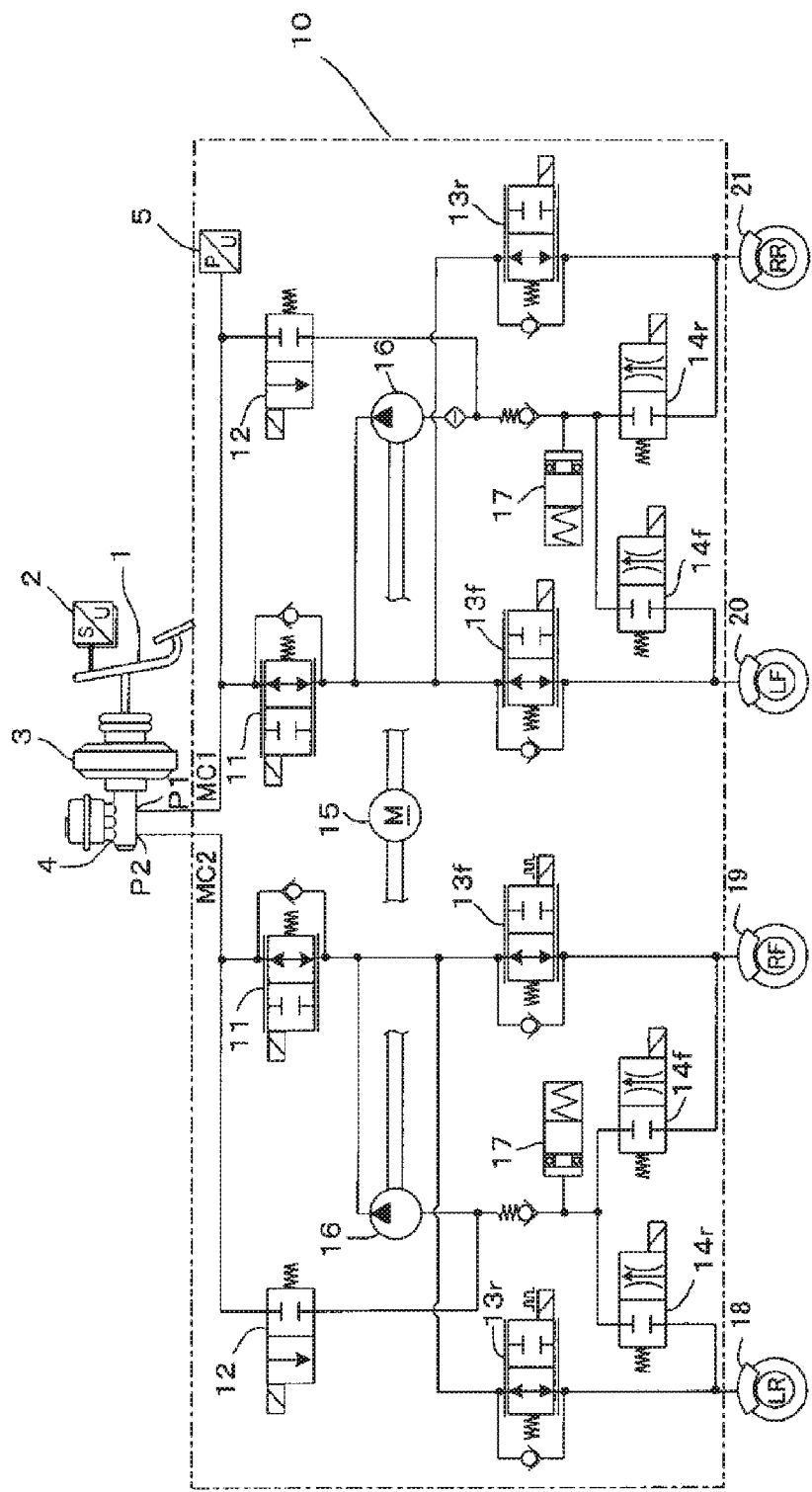
FIG. 1 is a diagram illustrating an example of a hydraulic circuit of a brake device for a vehicle according to an embodiment of the present invention.

FIG. 1 illustrates an example of a hydraulic circuit 10 configuring a hydraulic brake in a brake device for a vehicle to which the present invention is applied. As illustrated in FIG. 1, the present embodiment includes two brake lines, and is applied to a hydraulic circuit of a so-called X-type piping method in which brakes act on a set of two wheels which are one front wheel and one rear wheel diagonal to the one front wheel in each system. However, the hydraulic circuit to which the present invention is applied is not limited to the X-type piping method, for example, and may brake separately a front wheel side and a rear wheel side, which is a so-called ||-type piping method. In addition, the present invention is not limited to only a four-wheel vehicle, and can be widely applied to a vehicle which includes a two-wheel vehicle.

The present invention includes a regenerative brake and the hydraulic brake, and is applied to the brake device for a vehicle, in which a braking force is distributed between a hydraulic brake force and a regenerative brake force, with respect to a driver request brake force. Thus, in a vehicle which is a control target, a motor for vehicle wheel driving, which functions as a vehicle wheel driving source at the time of traveling and produces the regenerative brake force by functioning as a generator at the time of braking, and which is not illustrated, is mounted thereon as the regenerative brake, and a power train ECU and a brake ECU which control the motor are electrically connected thereto. The brake ECU controls the regenerative brake force by providing the power train ECU with a regenerative brake command value, and the power train ECU outputs a maximum value of the regenerative brake force which can be output at the time with respect to the brake ECU.

Further, inputs from a stroke sensor 2 attached to a brake pedal 1, a master cylinder hydraulic sensor 5 which detects an internal hydraulic pressure of a master cylinder 4, a vehicle wheel speed sensor (not illustrated) which indicates a speed of each of vehicle wheels (RF, LR, LF and RR), and the like, are provided to the brake ECU.

In a hydraulic circuit 10 illustrated in FIG. 1, a pedal force which is applied to the brake pedal 1 is amplified by a booster 3, and transferred to the master cylinder 4 which functions as a hydraulic producing source. Two pressure chambers that are defined by a primary piston and a secondary piston which are not illustrated are formed in the master cylinder 4. Each piston is pressed according to a brake pedal operation, and brake fluid escapes into the hydraulic circuit 10 via hydraulic ports P1 and P2 which communicate with each pressure chamber. Furthermore, the booster 3 is a pneumatic booster of the related art, and is connected to the brake pedal 1 side via an input rod (not illustrated). The amplified pedal force is transferred to the master cylinder 4 via a push rod (not illustrated) connected to the primary piston. In addition, in the same manner as the booster of the related art, the booster 3 has a so-called jump-in characteristics, and a predetermined gap (in other words, jump-in area) is formed between the input rod and a reaction disc adhered to the push rod, in such a manner that an area is formed in which a reaction becomes extremely small until the input rod of the booster 3 is mechanically connected to the push rod of the master cylinder 4.

Respective brake pipe lines MC1 and MC2 extend to a wheel cylinder of each of the vehicle wheel (RF, LR, LF and RR) from hydraulic ports P1 and P2 of the master cylinder 4. As described above, the hydraulic circuit in the brake device according to the present invention uses the X-type piping method, and in the example of FIG. 1, the hydraulic circuit 10 is configured such that the brake fluid is supplied via the brake pipe line MC2 to both the wheel cylinder of the right front wheel (RF) hydraulic brake (second hydraulic brake) 19 and the wheel cylinder of the left rear wheel (LR) hydraulic brake (first hydraulic brake) 18, and that the brake fluid is supplied via the brake pipe line MC1 to both the wheel cylinder of the left front wheel (LF) hydraulic brake (second hydraulic brake) 20 and the wheel cylinder of the right rear wheel (RR) hydraulic brake (first hydraulic brake) 21. As a result, each of the brakes 18, 19, 20 and 21 can produce the braking force in each vehicle wheel, by operating the wheel cylinders using the hydraulic pressure.

The hydraulic circuit of each system includes a circuit control valve 11 which is a normally opening type and can be linearly controlled, an absorption valve 12 which is a normally closing type and can be controlled by on and off, pressure increasing valves 13f and 13r which are the normally opening type and can be linearly controlled, and pressure decreasing valves 14f and 14r which are the normally closing type and can be controlled to be on and off, as electromagnetic valves. Further, the hydraulic circuit of each system includes pumps 16 which are driven by a pump motor 15, and a low pressure accumulator 17. The pressure increasing valve 13f and the pressure decreasing valve 14f which are provided so as to be adjacent to the right front wheel hydraulic brake 19 are used in an ABS control of the right front wheel hydraulic brake 19, and the pressure increasing valve (adjustment valve) 13r and the pressure decreasing valve 14r which are provided so as to be adjacent to the left rear wheel hydraulic brake 18 are used in an ABS control of the left rear wheel hydraulic brake 18.

The pressure increasing valve 13f (second pressure increasing valve) in the right front wheel side is provided between the master cylinder 4 and the circuit control valve 11, and the right front wheel hydraulic brake 19. The pressure increasing valve 13f which can be linearly controlled can continually adjust an amount of the brake fluid flowing from the master cylinder 4 side and the circuit control valve 11 side to the wheel cylinder side of the right front wheel hydraulic brake 19. In a state where the pressure increasing valve 13f is closed, the brake fluid flows from the right front wheel hydraulic brake 19 side to the master cylinder 4 side and the circuit control valve 11 side, but a bypass flow path including a check valve in which the brake fluid does not flow in a reverse direction thereof is provided in the pressure increasing valve 13f.

The pressure decreasing valve 14f (second pressure decreasing valve) in the right front wheel side is a solenoid valve which can be fully opened only or fully closed only, and is provided between the wheel cylinder of the right front wheel hydraulic brake 19 and the low pressure accumulator 17. When open, the pressure decreasing valve 14f can decrease a pressure of the brake fluid which is supplied to the wheel cylinder of the right front wheel hydraulic brake 19. In addition, the pressure decreasing valve 14f can adjust an amount of the brake fluid flowing from the wheel cylinder of the right front wheel hydraulic brake 19 to the low pressure accumulator 17 by intermittently repeating the opening and closing of the valve.

The pressure increasing valve 13r (first pressure increasing valve) in the left rear wheel side is provided between the master cylinder 4, the circuit control valve 11, the pressure increasing valve 13f and the wheel cylinder of the right front wheel hydraulic brake 19, and the wheel cylinder of the left rear wheel hydraulic brake 18. The pressure increasing valve 13r which can be linearly controlled can continually adjust an amount of the brake fluid flowing from the master cylinder 4, the circuit control valve 11, the pressure increasing valve 13f and the wheel cylinder side of the right front wheel hydraulic brake 19, to the wheel cylinder side of the left rear wheel hydraulic brake 18. In a state where the pressure increasing valve 13r is closed, the brake fluid flows from the left rear wheel hydraulic brake 18 side to the right front wheel hydraulic brake 19 side, but a bypass flow path including a check valve in which the brake fluid does not flow in a reverse direction thereof is provided in the pressure increasing valve 13r.

The pressure decreasing valve 14r (first pressure decreasing valve) in the left rear wheel side is a solenoid valve which can be fully opened only or fully closed only, and is provided between the wheel cylinder of the left rear wheel hydraulic brake 18 and the low pressure accumulator 17. When open, the pressure decreasing valve 14r can decrease a pressure of the brake fluid which is supplied to the wheel cylinder of the left rear wheel hydraulic brake 18, by supplying the brake fluid to the accumulator 17. In addition, the pressure decreasing valve 14r can adjust an amount of the brake fluid flowing from the wheel cylinder of the left rear wheel hydraulic brake 18 to the low pressure accumulator 17 by intermittently repeating the opening and closing of the valve.

The circuit control valve 11 is installed so as to connect or disconnect the pressure increasing valves 13f and 13r to the master cylinder 4, and the absorption valve 12 is installed so as to connect or disconnect the master cylinder 4 to an absorption side of the pump 16. Since this is the same as the configuration elements for a vehicle attitude control (ESC) of the related art, detailed description thereof will not be repeated. In addition, the above-described master cylinder hydraulic sensor 5 is arranged in one brake pipe line (brake pipe line MC1 in the example of FIG. 1).

Figure 2:
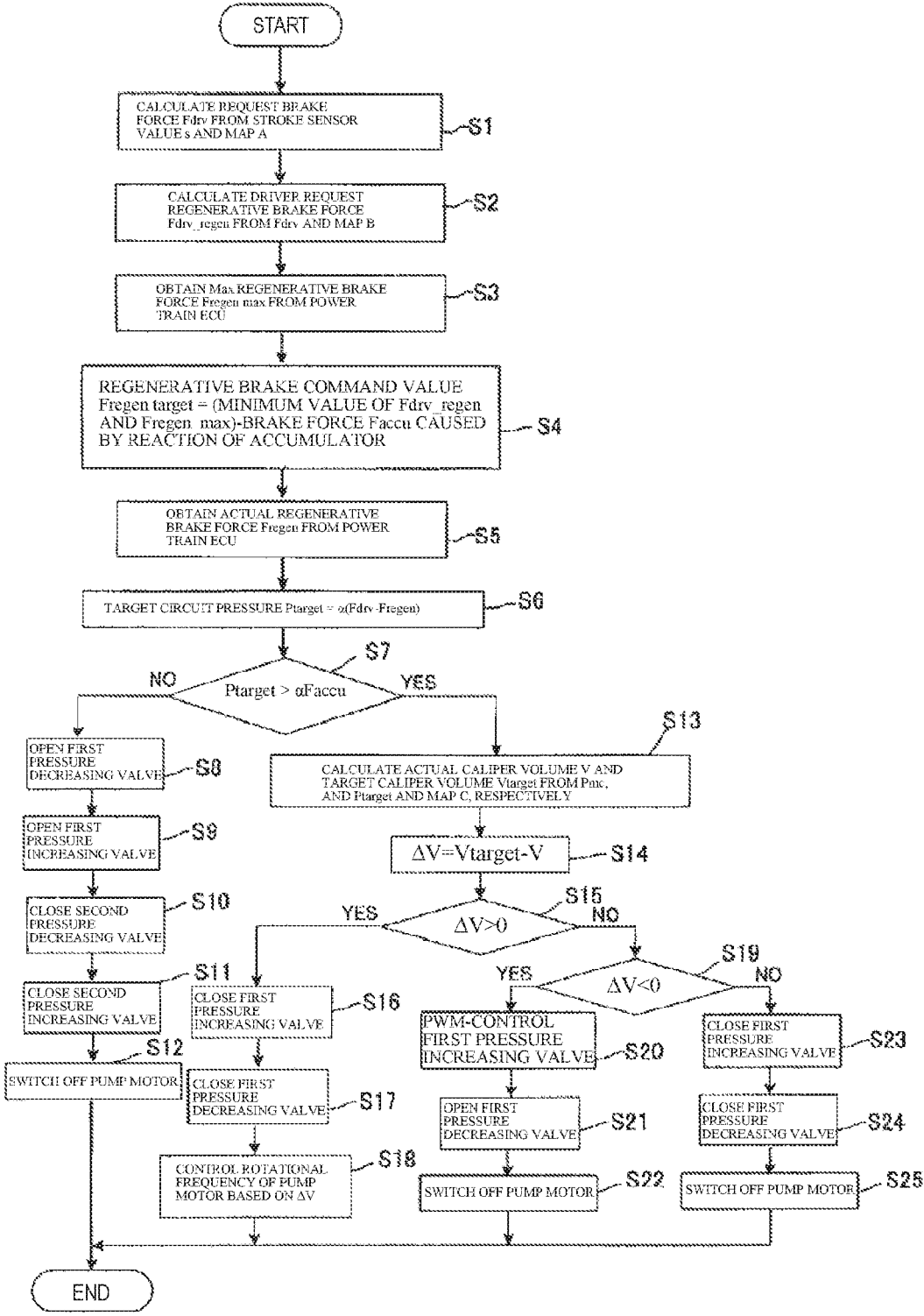
FIG. 2 is a flow chart illustrating an example of processing of a brake ECU.

An example of processing of the brake ECU in the above-described brake device for a vehicle is illustrated in a flow chart of FIG. 2. While the braking force is covered by only the regenerative brake force, the brake device for a vehicle according to the present embodiment can secure comfortable brake feel and sufficiently use the regenerative brake force, by performing the following processing. In addition, it is possible to appropriately control the braking force of the right front wheel hydraulic brake 19 and the left front wheel hydraulic brake 20, according to a change of the maximum regenerative brake force which can be regenerated by the regenerative brake. In the present embodiment, the right front wheel hydraulic brake 19 side and the left rear wheel hydraulic brake 18 side are only described, but the left front wheel hydraulic brake 20 side and the right rear wheel hydraulic brake 21 side are also controlled similarly.

The brake ECU first calculates the driver request brake force $F_{drv}$ which indicates a target braking force according to an operation of the driver, based on a stroke sensor value s of the stroke sensor 2 attached to the brake pedal 1. For being used in this calculation, a map A in which a correspondence relationship between the stroke sensor value s such as that illustrated in FIG. 3(A) and the driver request brake force $F_{drv}$ is previously set is stored in the brake ECU. Thus, the brake ECU calculates the driver request brake force $F_{drv}$ which is the target braking force from the stroke sensor value s and the map A (step S1).

Figure 3:
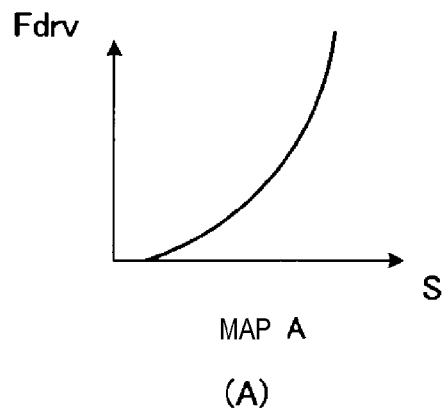
FIG. 3 is a diagram illustrating an example of a map which is used in the processing of FIG. 2.
Figure 3:
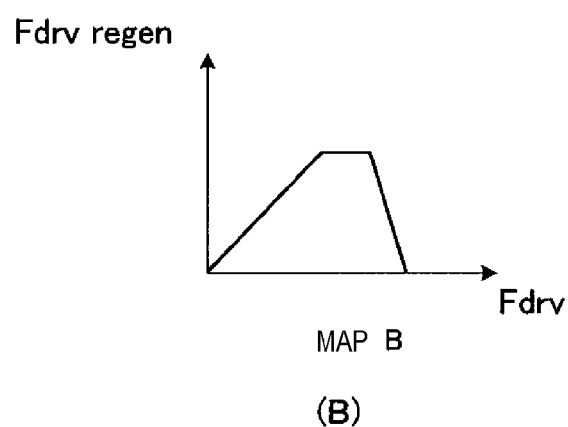
Figure 3:
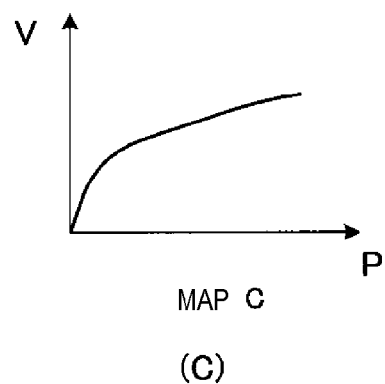

When the driver request brake force $F_{drv}$ is calculated, the brake ECU calculates a driver request regenerative brake force $F_{drv\ regen}$ as a target regenerative braking force to be distributed with respect to the driver request brake force $F_{drv}$ (step S2). For being used in this calculation, a map B such as that illustrated in, for example, FIG. 3(B) is stored in the brake ECU. The map B sets a correspondence relationship between the driver request brake force $F_{drv}$ and the driver request regenerative brake force $F_{drv\ regen}$. In the present embodiment, as illustrated in FIG. 3(B), the driver request regenerative brake force $F_{drv\ regen}$ with respect to a predetermined value of the driver request brake force $F_{drv}$ is set to zero.

When the driver request regenerative brake force $F_{drv\ regen}$ is calculated, the brake ECU obtains a maximum regenerative brake force $F_{regen}$ max that is a maximum value of the regenerative brake force which is obtained from the power train ECU and can be output at this time (step S3).

When the maximum regenerative brake force $F_{regen}$ max is obtained, the brake ECU compares the maximum regenerative brake force $F_{regen}$ max which is obtained in step S3 with the driver request regenerative brake force $F_{drv\ regen}$ which is calculated in step S2, and subtracts a brake force $F_{accu}$ caused by the reaction of the accumulator 17 from a smaller value. A value obtained by doing this is output to the power train ECU as a regenerative brake command value $F_{regen}$ target (step S4). The brake force $F_{accu}$ caused by the reaction of the accumulator 17 is a brake force produced by the reaction of the accumulator 17 when the pressure decreasing valve 14r is opened, and is a predetermined value which is previously set.

When the regenerative brake command value $F_{regen}$ target is output to the power train ECU, the brake ECU obtains the actual regenerative brake force $F_{regen}$ corresponding to a current actual regenerative brake force from the power train ECU (step S5).

When the actual regenerative brake force $F_{regen}$ is obtained, the brake ECU calculates a target circuit pressure $P_{target}$ based on a predetermined equation $P_{target}=\alpha(F_{drv}-F_{regen})$, in such a manner that the hydraulic brake force to be distributed with respect to the driver request brake force $F_{drv}$ is obtained (step S6). Furthermore, α is an integer for converting a brake force into a pressure.

When the target circuit pressure $P_{target}$ is calculated, the brake ECU determines whether the calculated target circuit pressure $P_{target}$ is greater than $\alpha F_{accu}$ or not (step S7). $\alpha F_{accu}$ is obtained by multiplying the brake force $F_{accu}$ caused by the reaction of the accumulator 17 by the integer α, and is a circuit pressure produced by the reaction of the accumulator 17 when the pressure decreasing valve 14r is opened. By this processing, the brake ECU can determine whether the request brake force is satisfied with only the regenerative brake based on the brake operation of the driver.

When it is determined that the target circuit pressure $P_{target}$ is not greater than $\alpha F_{accu}$ (step S7: NO) in step S7, the brake ECU, makes the pressure decreasing valve 14r in the left rear wheel side be in an opened state (step S8), makes the pressure increasing valve 13r in the left rear wheel side be in an opened state (step S9), makes the pressure decreasing valve 14f in the right front wheel side be in a closed state (step S10), makes the pressure increasing valve 13f in the right front wheel side be in a closed state (step S11), makes the pump motor 15 be in an inoperative condition (step S12), and then, ends a series of processing. Thus, in a case where the request brake force is not satisfied with only the regenerative brake by the processing of steps S8 to S12, the brake ECU opens the pressure decreasing valve 14r and the pressure increasing valve 13r which are in the left rear wheel side, and closes the pressure decreasing valve 14f and the pressure increasing valve 13f which are in the right front wheel side. As a result, since the brake fluid according to an amount of operation of the brake pedal 1 is exhausted to the accumulator 17 via the pressure increasing valve 13r and the pressure decreasing valve 14r, in the rear wheel side, the driver can obtain good feeling of operation of the brake pedal 1 by natural stepping onto the brake pedal 1. On the other hand, since the pressure increasing valve 13f and the pressure decreasing valve 14f are closed in the front wheel side, the reaction of the accumulator 17 is not applied to the wheel, and the hydraulic brake is not produced. Thus, it is possible to secure good brake feel, to suppress an influence of the reaction of the accumulator 17, and to sufficiently use the regenerative brake force. In addition, since the front wheel side brake force predominates in the braking force, it is possible to remarkably reduce dragging of the brake caused by the reaction of the accumulator 17, and to more efficiently realize an effective use of the regenerative brake, by the reaction of the accumulator 17 is not applied to the front wheels, in the same manner as the present embodiment.

On the other hand, when it is determined that the target circuit pressure $P_{target}$ is greater than $\alpha F_{accu}$ in step S7 (step S7: YES), the brake ECU calculates each of an actual caliper volume V (volume of the brake fluid in the wheel cylinder of the caliper at this time) and a target caliper volume $V_{target}$ (volume of the brake fluid in the caliper wheel cylinder, which is necessary to obtain the target circuit pressure $P_{target}$), based on a master cylinder sensor hydraulic pressure Pmc and the target circuit pressure $P_{target}$ which are detected by the master cylinder hydraulic sensor 5, and a map C illustrated in FIG. 3(C) (step S13). For being used in this calculation, the map C in which a relationship between the pressure P and the caliper volume V such as that illustrated in FIG. 3(C) is set is stored in the brake ECU.

When each of the actual caliper volume V and the target caliper volume $V_{target}$ is calculated, the brake ECU calculates a difference $\Delta V$ between the target caliper volume $V_{target}$ and the actual caliper volume V, based on a predetermined equation $\Delta V = V_{target} - V$ (step S14).

When $\Delta V$ is calculated, the brake ECU determines whether $\Delta V$ is positive or not (step S15).

When it is determined that $\Delta V$ is positive in step S15 (step S15: YES), the brake ECU makes the pressure increasing valve 13r in the left rear wheel side be in the closed state (step S16), makes the pressure decreasing valve 14r in the left rear wheel side be in the closed state (step S17), operates the motor 15 by controlling rotational frequency of the pump motor 15 (step S18), and then ends a series of processing. The rotational frequency of the motor 15 at this time is determined based on a value of $\Delta V$.

On the other hand, when it is determined that $\Delta V$ is not positive in step S15 (step S15: NO), the brake ECU determines whether $\Delta V$ is negative or not (step S19).

When it is determined that $\Delta V$ is negative in step S19 (step S19: YES), the brake ECU begins to continually increase little by little an opening degree of the pressure increasing valve 13r in the left rear wheel side under a PWM control (step S20). When the opening degree of the pressure increasing valve 13r in the left rear wheel side begins to increase little by little, the brake ECU opens the pressure decreasing valve 14r in the left rear wheel side (step S21), makes the pump motor 15 be in the inoperative condition (step S22), and then ends a series of processing. As a result, since the pressure decreasing valve 14r in the left rear wheel side is maintained in the opened state and the pressure decreasing valve 14f in the right front wheel side is maintained in the closed state, pressure decreasing of the brake fluid which is supplied to the wheel cylinder of the right front wheel hydraulic brake 19 is adjusted by the pressure increasing valve 13r in the left rear wheel side. By the processing of steps S20 to S22, in a case where the regenerative brake force is increased, in a state where the right front wheel hydraulic brake 19 does not produce the hydraulic brake force, the brake ECU can continually decrease little by little the pressure of the brake fluid supplied to the wheel cylinder of the right front wheel hydraulic brake 19.

On the other hand, when it is determined that $\Delta V$ is not negative in step S19 (step S19: NO), the brake ECU closes the pressure increasing valve 13r in the left rear wheel side (step S23), closes the pressure decreasing valve 14r in the left rear wheel side (step S24), makes the pump motor 15 be in the inoperative condition (step S25), and then ends a series of processing. By the processing of steps S23 to S25, when $\Delta V$ is zero, that is, the target caliper volume $V_{target}$ is the same as the actual caliper volume V, the brake ECU can retain the braking force of the right front wheel hydraulic brake 19.

The brake ECU repeats the above-described processing at predetermined timings.

In the present embodiment, in a case where the braking forces of the front wheel hydraulic brakes 19 and 20 are decreased, the brake ECU continually increases the opening degrees of the pressure increasing valves 13r and 13r in the rear wheel side little by little, and opens the pressure decreasing valves 14r and 14r in the rear wheel side. As a result, in a case where the regenerative brake force is increased, in a state where the hydraulic brake force is produced by braking the front wheel hydraulic brakes 19 and 20, when the pressure of the brake fluid supplied to the wheel cylinders of the front wheel hydraulic brakes 19 and 20 is decreased, in order to respond to a change of the maximum regenerative brake force caused by a vehicle speed, a charging state of a battery, or the like at the time of the vehicle braking, it is not necessary for the pressure decreasing valves 14f and 14f in the front wheel side to be opened or closed. For this reason, it is possible to prevent the noise caused by the pressure decreasing valves 14f and 14f in the front wheel side being open or closed from occurring.

Figure 4:
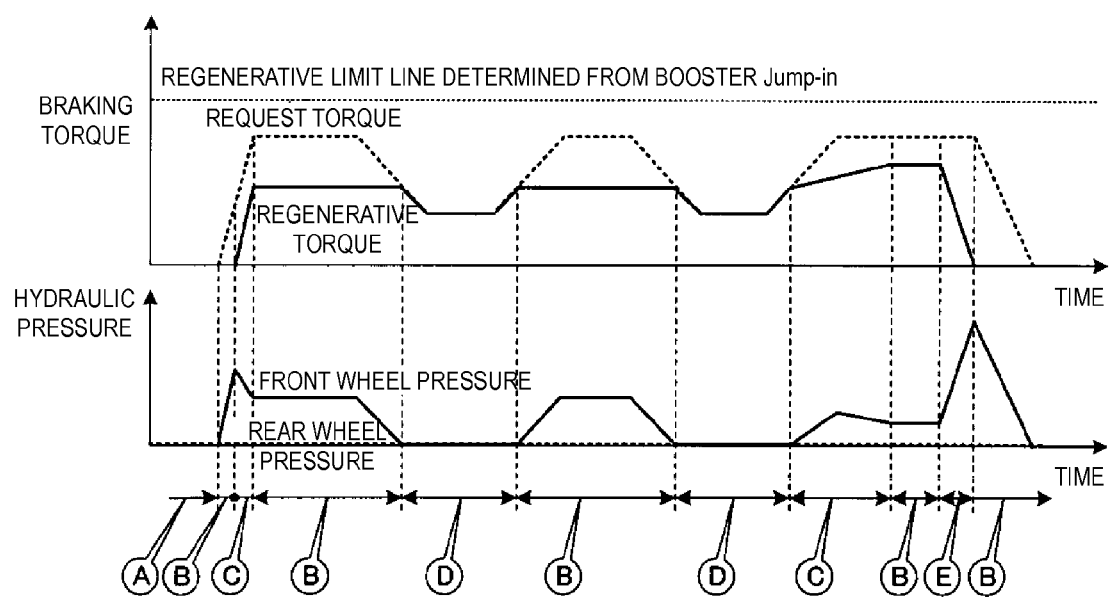
FIG. 4 is a timing chart illustrating a control example of a case where a maximum regenerative brake force increases.

FIG. 4 is a diagram illustrating an example of a timing chart in a case where the maximum regenerative brake force is increased during braking.

Furthermore, unless specified otherwise in FIG. 4 and the following description, the "maximum regenerative brake force" is input from the power train ECU to the brake ECU, and indicates a maximum value of the regenerative brake force which can be output at this time. As described above, the maximum regenerative brake force is changed by the vehicle speed, the charging state of the battery, or the like, during the braking.

In a graph between a braking torque and time in FIG. 4, the regenerative brake force (corresponding to regenerative brake command value $F_{regen}$) is denoted by a solid line as a regenerative torque, and the driver request brake force $F_{drv}$ is denoted by a dashed line as a request torque, respectively. On the other hand, in the graph between the brake hydraulic pressure and the time, the front wheel pressure is denoted by a solid line, and the rear wheel pressure is denoted by a dashed line, respectively.

As illustrated by the first area D in FIG. 4, while the driver request brake force $F_{drv}$ is covered by only the regenerative brake force, the pressure decreasing valve 14r in the rear wheel side is in the opened state. Specifically, in the area D, the driver request brake force $F_{drv}$ caused by the stepping on the pedal increases in a state where the hydraulic brake force is zero to $F_{accu}$, and at this time, the driver request regenerative brake force $F_{drv\ regen}$ also increases based on the map B. Until the driver request regenerative brake force $F_{drv\ regen}$ becomes greater than the maximum regenerative brake force and the target circuit pressure $P_{target}$ becomes greater than $\alpha F_{accu}$, the pressure decreasing valve 14r in the rear wheel side is maintained in the opened state, and the brake fluid corresponding to the amount of pedal operation is exhausted to the low pressure accumulator 17.

When the driver request regenerative brake force $F_{drv\ regen}$ becomes greater than the maximum regenerative brake force and the driver request brake force $F_{drv}$ is not covered by only the regenerative brake force (the target circuit pressure $P_{target}$ is greater than $\alpha F_{accu}$), the pressure decreasing valve 14r in the rear wheel side is closed, and the hydraulic brake force corresponding to the amount of the pedal operation is produced (area B). At this time, when the driver request regenerative brake force $F_{drv\ regen}$ becomes lowered to the maximum regenerative brake force again, the pressure decreasing valve 14r in the rear wheel side is maintained in the opened state, and the brake fluid corresponding to the amount of the pedal operation is exhausted to the low pressure accumulator 17 (area D).

When the maximum regenerative brake force begins to increase, the difference $\Delta V$ between the target caliper volume $V_{target}$ and the actual caliper volume V is negative, and accordingly, the opening degree of the pressure increasing valve 13r in the rear wheel side is continually increased little by little by the PWM control, and the pressure decreasing valve 14r in the rear wheel side is opened (area C). Thus, according to the present embodiment, when the brake pressure in the front wheel side is decreased, the pressure decreasing valve 14f in the front wheel side is not opened, and the opening degree of the pressure increasing valve 13r in the rear wheel side is continually increased little by little, and accordingly, it is possible to avoid the problem of vibration or the noise in a case where the pressure decreasing valve is opened by the pressure.

When the maximum regenerative brake force is not increased, the pressure increasing valve 13r in the rear wheel side and the pressure decreasing valve 14r in the rear wheel side are maintained in the closed state (area B).

When the maximum regenerative brake force begins to decrease, the pressure increasing valve 13r in the rear wheel side and the pressure decreasing valve 14r in the rear wheel side are maintained in the closed state as they are, and the pressure of the brake fluid in the wheel cylinders of the hydraulic brakes 19 and 20 in the front wheel side is increased by the pump 16 being operated (area E).

When the braking forces of the hydraulic brakes 19 and 20 in the front wheel side arrive at the driver request brake force $F_{drv}$, the operation of the pump 16 is stopped (area B).

As described above, the present invention is described based on the embodiment, but the present invention is not limited to this. For example, in the above-described embodiment, since the actual caliper volume V is calculated, the master cylinder sensor hydraulic pressure Pmc detected by the master cylinder hydraulic sensor 5 is used, but the present invention is not limited to this. If the actual caliper volume V can be calculated, wheel cylinder hydraulic sensors which detect internal hydraulic pressures of the wheel cylinders of the front wheel hydraulic brakes 19 and 20 may be provided between the wheel cylinders of the front wheel hydraulic brakes 19 and 20 and the pressure increasing valves 13f and 13f, and the hydraulic pressure detected by the wheel cylinder hydraulic sensor may be used instead of the master cylinder sensor hydraulic pressure Pmc.

In addition, in the above-described embodiment, when the pressure of the brake fluid supplied to the wheel cylinders of the front wheel hydraulic brakes 19 and 20 is decreased, the brake ECU continually increases the opening degrees of the pressure increasing valves 13r and 13r in the rear wheel side little by little, and then, opens the pressure decreasing valves 14r and 14r in the rear wheel side, but the present invention is not limited to this. If the pressure of the brake fluid supplied to the wheel cylinders of the front wheel hydraulic brakes 19 and 20 can be continually decreased little by little, the opening degrees of the pressure increasing valves 13r and 13r in the rear wheel side may be increased, after the pressure decreasing valves 14r and 14r in the rear wheel side are opened.

Furthermore, in the present embodiment, in a case where the braking force is covered by only the regenerative brake force, it is configured such that the pressure decreasing valves 14r and 14r and the pressure increasing valves 13r and 13r which are in the rear wheel side are opened, and the pressure decreasing valves 14f and 14f and the pressure increasing valves 13f and 13f which are in the front wheel side are closed, but the present invention is not limited to this. In a case where the braking force is covered by only the regenerative brake force, it may be configured such that the pressure decreasing valves 14r and 14r and the pressure increasing valves 13r and 13r which are in the rear wheel side are closed, and the pressure decreasing valves 14f and 14f and the pressure increasing valves 13f and 13f which are in the front wheel side are opened. In the present invention, in a case where the braking force is covered by only the regenerative brake force, regardless of whether the valves are in the front wheel side or in the rear wheel side, the pressure decreasing valve and the pressure increasing valve which are in the opened state are termed the first pressure decreasing valve and the first pressure increasing valve, respectively, and the pressure decreasing valve and the pressure increasing valve which are in the closed state are termed the second pressure decreasing valve and the second pressure increasing valve, respectively.

In addition, the above-described embodiment is configured such that the reaction of the accumulator is not applied to only one hydraulic brake (for example, only the front wheel side of the X-type piping method) in one brake line, but the present invention is not limited to this. For example, in a case where the present invention is applied to the ||-type piping method and the braking force is covered by only the regenerative brake force, it may be configured such that the pressure decreasing valves and the pressure increasing valves in the brake line in the front wheel side are all closed, and the pressure decreasing valves and the pressure increasing valves in the brake line in the rear wheel side are all opened. However, in this case, an amount of the brake fluid escaping into the accumulator 17, for example, in the rear wheel side is increased, and accordingly, when the hydraulic brake force increases, it is necessary to increase the rotational frequency of the pump motor 15. Thus, the reaction of the accumulator is set so as not to be applied to only one hydraulic brake in one brake line (in other words, a pressure decreasing valve is closed with regard to only one hydraulic brake in one brake line, and is opened with regard to the other hydraulic brakes), and thereby it is possible to decrease the rotational frequency of the pump motor 15, and to reduce the noise and the vibration when the pump motor operates, compared to a case where all the pressure decreasing valves in the one brake line are opened.

The present invention is not limited to a four-wheel vehicle, and can be widely applied to a vehicle which also includes a two-wheel vehicle, and particularly to a brake device for a vehicle, which includes a so-called regenerative cooperation brake.

REFERENCE SIGNS LIST

1: brake pedal
2: stroke sensor
3: booster
4: master cylinder
P1, P2: hydraulic port
MC1, MC2: brake pipe line
5: master cylinder hydraulic sensor
6: wheel cylinder hydraulic sensor
10: hydraulic circuit
11: circuit control valve
12: absorption valve
13f: pressure increasing valve (second pressure increasing valve)
13r: pressure increasing valve (first pressure increasing valve, adjustment valve)
14f: pressure decreasing valve (second pressure decreasing valve)
14r: pressure decreasing valve (first pressure decreasing valve)
15: pump motor
16: pump
17: low pressure accumulator
18: left rear wheel hydraulic brake (first hydraulic brake)

19: right front wheel hydraulic brake (second hydraulic brake)
20: left front wheel hydraulic brake (second hydraulic brake)
21: right rear wheel hydraulic brake (first hydraulic brake)

The invention claimed is:

1. A brake device for a vehicle, that includes at least a first hydraulic brake and a second hydraulic brake which produce hydraulic brake forces, and a regenerative brake which produces a regenerative brake force, and that performs a distribution of the hydraulic brake force and the regenerative brake force with respect to a driver request brake force, comprising:
a first pressure increasing valve which can increase a pressure of brake fluid supplied to the first hydraulic brake;
a first pressure decreasing valve which can decrease the pressure of the brake fluid supplied to the first hydraulic brake;
a second pressure increasing valve which can increase a pressure of brake fluid supplied to the second hydraulic brake; and
a second pressure decreasing valve which can decrease the pressure of the brake fluid supplied to the second hydraulic brake,
wherein the first pressure decreasing valve and the second pressure decreasing valve communicate with an accumulator, and
wherein while the driver request brake force is covered by only the regenerative brake force, the brake fluid escapes into the accumulator when the first pressure increasing valve and the first pressure decreasing valve are opened, and a reaction of the accumulator is not applied to vehicle wheels when the second pressure increasing valve and the second pressure decreasing valve are closed.

2. The brake device for a vehicle according to claim 1,
wherein the first hydraulic brake is a rear wheel hydraulic brake, and the second hydraulic brake is a front wheel hydraulic brake.

3. The brake device for a vehicle according to claim 1, further comprising:
multiple brake lines,
wherein the first hydraulic brake and the second hydraulic brake are provided in one brake line.

4. The brake device for a vehicle according to claim 3,
wherein the first pressure increasing valve is provided between the first hydraulic brake and the second hydraulic brake, and is an adjustment valve which can continually adjust an amount of the brake fluid flowing from a second hydraulic brake side to a first hydraulic brake side, and
wherein in a case where a hydraulic brake force of the second hydraulic brake is decreased, an opening degree of the adjustment valve is continually increased and the first pressure decreasing valve is opened.

5. The brake device for a vehicle according to claim 4,
wherein in a case where the hydraulic brake force of the second hydraulic brake is decreased, the first hydraulic brake does not produce a braking force.

6. The brake device for a vehicle according to claim 4,
wherein the first pressure decreasing valve is a solenoid valve which can be intermittently opened and closed, and is maintained in an opened state in a case where the hydraulic brake force of the second hydraulic brake is decreased.

7. The brake device for a vehicle according to claim 4,
wherein in a case where the regenerative brake force increases, the second pressure decreasing valve is maintained in a closed state.

8. A control method of a brake device for a vehicle, that includes at least a first hydraulic brake and a second hydraulic brake which produce hydraulic brake forces, and a regenerative brake which produces a regenerative brake force, and that performs a distribution of the hydraulic brake force and the regenerative brake force with respect to a driver request brake force,
the brake device for a vehicle including,
a first pressure increasing valve which can increase a pressure of brake fluid supplied to the first hydraulic brake,
a first pressure decreasing valve which can decrease the pressure of the brake fluid supplied to the first hydraulic brake,
a second pressure increasing valve which can increase a pressure of brake fluid supplied to the second hydraulic brake, and
a second pressure decreasing valve which can decrease the pressure of the brake fluid supplied to the second hydraulic brake,
wherein the first pressure decreasing valve and the second pressure decreasing valve communicate with an accumulator, and
wherein the control method, in a case where the driver request brake force is covered by only the regenerative brake force, comprises:
a step of opening the first pressure decreasing valve;
a step of opening the first pressure increasing valve, wherein by opening the first pressure decreasing valve and the first pressure increasing valve the brake fluid escapes into the accumulator;
a step of closing the second pressure decreasing valve; and
a step of closing the second pressure increasing valve, and wherein by closing the second pressure decreasing valve and the second pressure increasing valve a reaction of the accumulator is not applied to vehicle wheels.

9. The control method of a brake device for a vehicle according to claim 8,
wherein the first hydraulic brake is a rear wheel hydraulic brake, and the second hydraulic brake is a front wheel hydraulic brake.

10. The control method of a brake device for a vehicle according to claim 8,
wherein the brake device for a vehicle further includes multiple brake lines, and
wherein the first hydraulic brake and the second hydraulic brake are provided in one brake line.

11. The control method of a brake device for a vehicle according to claim 10,
wherein the first pressure increasing valve is provided between the first hydraulic brake and the second hydraulic brake, and is an adjustment valve which can continually adjust an amount of the brake fluid flowing from a second hydraulic brake side to a first hydraulic brake side, and
wherein the control method, in a case where a hydraulic brake force of the second hydraulic brake is decreased, further comprises:
a step of continually increasing an opening degree of the adjustment valve; and
a step of opening the first pressure decreasing valve.

12. The control method of a brake device for a vehicle according to claim 11, wherein in a case where the hydraulic brake force of the second hydraulic brake is decreased, the first hydraulic brake does not produce a braking force.

13. The control method of a brake device for a vehicle according to claim 11,
wherein the first pressure decreasing valve is a solenoid valve which can be intermittently opened and closed, and is maintained in an opened state in a case where the hydraulic brake force of the second hydraulic brake is decreased.

14. The control method of a brake device for a vehicle according to claim 11,
wherein in a case where the regenerative brake force increases, the second pressure decreasing valve is maintained in a closed state.

15. The control method of a brake device for a vehicle according to claim 9,
wherein the brake device for a vehicle further includes multiple brake lines, and
wherein the first hydraulic brake and the second hydraulic brake are provided in one brake line.

16. The control method of a brake device for a vehicle according to claim 15,
wherein the first pressure increasing valve is provided between the first hydraulic brake and the second hydraulic brake, and is an adjustment valve which can continually adjust an amount of the brake fluid flowing from a second hydraulic brake side to a first hydraulic brake side, and
wherein the control method, in a case where a hydraulic brake force of the second hydraulic brake is decreased, further comprises:
a step of continually increasing an opening degree of the adjustment valve; and
a step of opening the first pressure decreasing valve.

17. The control method of a brake device for a vehicle according to claim 16,
wherein in a case where the hydraulic brake force of the second hydraulic brake is decreased, the first hydraulic brake does not produce a braking force.

18. The control method of a brake device for a vehicle according to claim 17,
wherein the first pressure decreasing valve is a solenoid valve which can be intermittently opened and closed, and is maintained in an opened state in a case where the hydraulic brake force of the second hydraulic brake is decreased.

19. The control method of a brake device for a vehicle according to claim 18,
wherein in a case where the regenerative brake force increases, the second pressure decreasing valve is maintained in a closed state.

* * * * *